INVENTOR
FRANK N. DiMEO

BY Alfred B. Levine

ATTORNEY

Nov. 25, 1969    F. N. DI MEO    3,480,946
SUCCESSIVE APPROXIMATION ROTARY ANGLE TO DIGITAL CONVERTER
Filed March 31, 1966    2 Sheets-Sheet 2

INVENTOR
FRANK N. DiMEO

BY Alfred O. Levine
ATTORNEY

United States Patent Office 3,480,946
Patented Nov. 25, 1969

3,480,946
SUCCESSIVE APPROXIMATION ROTARY ANGLE TO DIGITAL CONVERTER
Frank N. DiMeo, Philadelphia, Pa., assignor to Litton Precision Products, Inc., Clifton Heights, Pa., a corporation of Delaware
Filed Mar. 31, 1966, Ser. No. 539,060
Int. Cl. H04l *3/00*
U.S. Cl. 340—347           10 Claims

ABSTRACT OF THE DISCLOSURE

A rotary angle to digital converter having a plurality of cascaded stages for successively reducing an angular quadrant of the rotary angle to be determined and with each stage employing circuits for subtracting fixed reference angles from the angle by trigonometric identity processing.

---

The present invention relates to analog to digital converters and specifically to shaft angle to digital converters utilizing signals representative of trigonometric functions of the angle.

Two types of devices have been used extensively to perform shaft to digital conversion, utilizing trigonometric functions. In one type, sine and cosine functions are represented as series of pulse trains which are generated by suitable transducers. These pulse signals serve to control counters which follow the pulse train signals and indicate the angular position of the shaft. Obviously, the equipment necessary to tranduce the angular motion to electrical pulse trains and the counters must be quite expensive and complex in order to be reliable within any reasonable limits. Further, rapid variations in input angular motion necessitates a time delay sufficient to enable the counters to respond step by step to such changes. And, the time allowed for any reading must be sufficient to allow for the longest response.

In yet another type of shaft to digital converter, trigonometric functions are compared to reference signals by the *linear* approximation method. This method is inherently slow and inaccurate, and even slower and more inaccurate when operating on trigonometric functions. Because the trigonometric function is not at all linear in certain regions, for example the sine function near 90°, these regions must be either excluded completely from consideration, or at best, large discrepancies will occur.

The present invention provides a converter in which the need for linear successive approximation techniques, or counters and pulse generators, is obviated by utilizing equipment which acts upon signals indicative of the trigonometric functions of the angular position of an input shaft. Very generally according to the invention, analog signals representing the sine and cosine of the angle to be encoded are successively diminished by analog reference angle signals decreasing in value of angle, by the use of trigonometric identities. A digital code is produced representing the various reference angles contained in the shaft angle to be encoded.

An object of the present invention is the provision of an accurate and inexpensive shaft to digital converter.

A further object of the invention is the provision of a reliable and rapid shaft to digital converter.

Yet a still further object is to provide for a lightweight converter having a minimum number of components without sacrificing quality or accuracy of operation.

Other objects and advantages of this invention will become more fully apparent from consideration of the following description taken in conjunction with the accompanying drawing wherein.

Briefly, the converter operation comprises deriving an analog input signal representative of the sine and cosine functions of an angle $\theta$ through which an input shaft has moved, comparing the sine function to the sine of a reference angle $\Phi$, deriving a digital output signal dependent upon the result of the comparison, and generating analog signals representative to the sin $(\theta - \psi)$ and cos $(\theta - \psi)$ which are applied to the next successive encoder stage, where $\psi = \Phi$ if $\theta \geq \Phi$ and $\psi = 0°$ if $\theta < \Phi$. The next stage utilizes the same circuits as the previous stage, but employs a different and smaller reference angle function for comparison. The analog output function of this stage is supplied to a further stage using a still smaller reference angle with the total number of such stages being employed depending upon the accuracy of the output signal desired. By utilizing logic circuitry, which acts directly upon the values of trigonometric functions and converts by utilizing well known trigonometric identities, the error, created by the disparity present in prior art devices between linear approximations and the value of the function for any angle, is removed.

Figure 1:
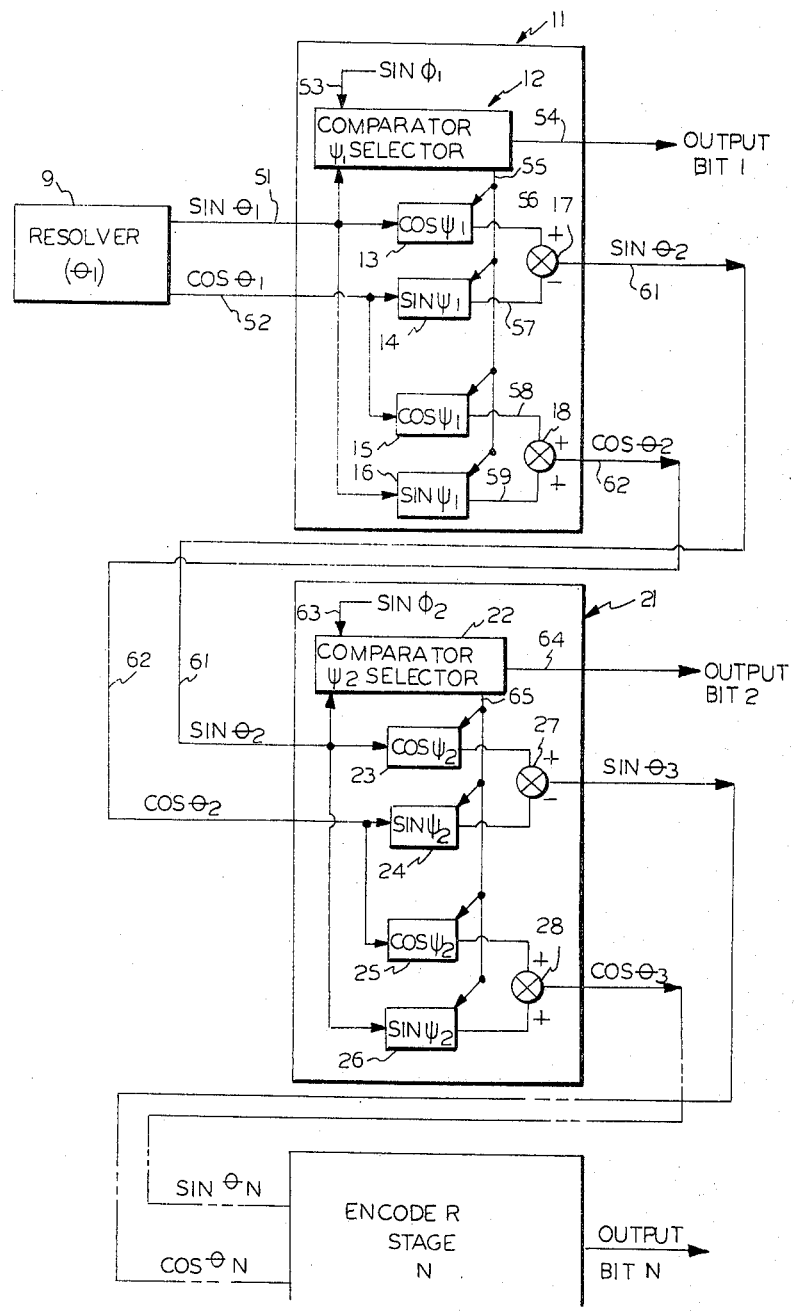
FIG. 1 illustrates in block diagram from one embodiment of the invention.

Turning now to FIG. 1 of the drawing, there is shown a resolver 9 from which two output leads 51 and 52 connect to a first encoder stage 11, the lead 51 splits to provide input signals to a comparator 12, and multipliers 13 and 16, while output lead 52 provides connections to multipliers 14 and 15. Comparator 12 has another input signal sin $\Phi_1$ applied thereto over lead 53, and provides output signals over leads 54 and 55. The lead 54 provides one "bit" of the output signal of the converter which may connect to a storage or indicating device or to subsequent circuitry (not shown). The signal derived from comparator 12 over lead 55 is connected to each of the multiplication devices 13 to 16. Multipliers 13 and 14, and 15 and 16 are connected to addition or summation circuits 17 and 18 over leads 56 to 59, respectively. The outputs from summers 17 and 18 are applied as input signals to the next encoder stage 21 over leads 61 and 62.

Encoder stages 21 to N are of identical structure and operation as encoder stage 11, differing therefrom only in the input and reference function signals applied thereto.

Considering the operation of this system in greater detail, the resolver 9 is connected to an input shaft (not shown) which is rotated to an angle $\theta_1$ from a reference point. This shaft angle is that information which the device will convert to digital information. The angle $\theta_1$ is assumed to be acute. The quadrant of the angle may be generated as a digital quantity by any of a number of means well known to those skilled in the art. The signals over leads 51 and 52 are representative of sin $\theta_1$ and cos $\theta_1$, respectively. The amplitude of the sin $\theta_1$ signal applied to comparator 12 is compared in comparator 12 with the amplitude of the reference signal sin $\Phi_1$, applied over lead 53. If sin $\theta_1$ is equal to or greater than the sin $\Phi_1$, the output from the comparator 12 over leads 54 will be a first signal level, for example, a binary "1." A second level of output signal, perhaps a binary "0," will be generated if sin $\theta_1$ is less than the sin $\Phi_1$. The output over lead 54 serves as the first "bit" of the output signal. Zero or one signals may be generated if a binary output is desired or the output of each stage may be weighted to supply a counter or the like, so that another digital number base may be used.

The output over lead 55 is applied to each of the multipliers 13 to 16. Multipliers 13 and 15 serve to multiply $\cos \psi_1$ by $\sin \theta_1$ and $\cos \theta_1$ respectively and multipliers 14 and 16 serve to multiply $\sin \psi_1$ with $\cos \theta_1$ and $\sin \theta_1$ respectively. If the comparison produces a first level or $\sin \theta_1 \geq \sin \Phi_1$ then $\psi_1 = \Phi_1$, on the other hand, if the second level is produced or $\sin \theta_1 < \sin \Phi_1$ then $\psi_1 = 0°$.

Multiplier 13 produces a signal $\sin \theta_1 \cos \psi_1$ over lead 56, and multiplier 14 produces a signal $\cos \theta_1 \sin \psi_1$ over lead 57. These signals are added or summed in circuit 17 and the output over lead 61 is: $\sin \theta_1 \cos \psi_1 - \cos \theta_1 \sin \psi_1$. A well known trigonometric identity is that $\sin \theta_1 \cos \psi_1 - \cos \theta_1 \sin \psi_1 = \sin(\theta_1 - \psi_1)$. In a similar manner, the output on lead 62 is: $\cos \theta_1 \cos \psi_1 + \sin \theta_1 \sin \psi_1 = \cos(\theta_1 - \psi_1)$. Setting $\theta_1 - \psi_1 = \theta_2$, the inputs to encoder stage 21 are $\sin \theta_2$ and $\cos \theta_2$. The same operation occurs in stage 21 yielding the second output "bit" signal over lead 64 and signals equal to $\sin \theta_3$ and $\cos \theta_3$ serve as inputs to the next encoder stage. Where $$\theta_3 = \theta_2 - \psi_2 = \theta_1 - \psi_1 - \psi_2$$

For purposes of illustration, assume $\theta_1 = 60.000°$, $$\Phi = \frac{45°}{2^{N-1}}$$

where N is equal to the order of the encoder stage. Thus the reference signal to stage 11 will be $\sin 45.000°$, to stage 21, $\sin 22.500°$ to stage 31 $\sin 11.250°$ and to stage N $$\sin \frac{45°}{2^{N-1}}$$

Resolver 9 will generate signals $\sin 60°$ and $\cos 60°$. A first level or binary "1" will be generated by comparator 12 since $\sin 60° > \sin 45°$, and the signal over lead 55 will be such that $\psi_1 = 45°$. Thus, the output of adder 17 will be $\sin 15°$ or $\sin(60° - 45°)$, and added 18 will generate a signal $\cos 15°$. These last mentioned signals are applied to encoder stage 21 over leads 61 and 62. Since $\Phi_2 = 22.5°$ in this example, and $\theta_2 < \Phi_2$ ($15° < 22.5°$), a binary zero output signal will be generated by comparator 22 over leads 64 and 65 and $\psi_2 = 0°$. Thus the outputs from summation circuits 27 and 28, $\sin \theta_3$ and $\cos \theta_3$, will be $\sin 15°$ and $\cos 15°$.

The reference signal applied to the comparator of the third encoder stage N is $$\sin \frac{45°}{2^{N-1}}$$

or $\sin 11.25°$. Since $15°$ is greater than $11.25°$, a first level output is generated by the comparator in this stage and $\psi_3$ will equal $11.25°$. The angle $\theta_4$, sine and cosine functions of which are applied to the fourth stage, will be $\sin 5.6250°$ and $\cos 5.6250°$.

In succeeding stages if present, the same process occurs as has been described above in conjunction with the operation of stages 11, 21 and N. Thus, if N were equal to 5 or there were 5 encoder stages, a binary indication of a shaft angle of $60°$ would appear as the code 10101. As generally mentioned above, the same digital output would be present for angles of $120°$, $240°$ and $300°$ and an additional bit or bits would indicate which of the specific angles was present.

Figure 2:
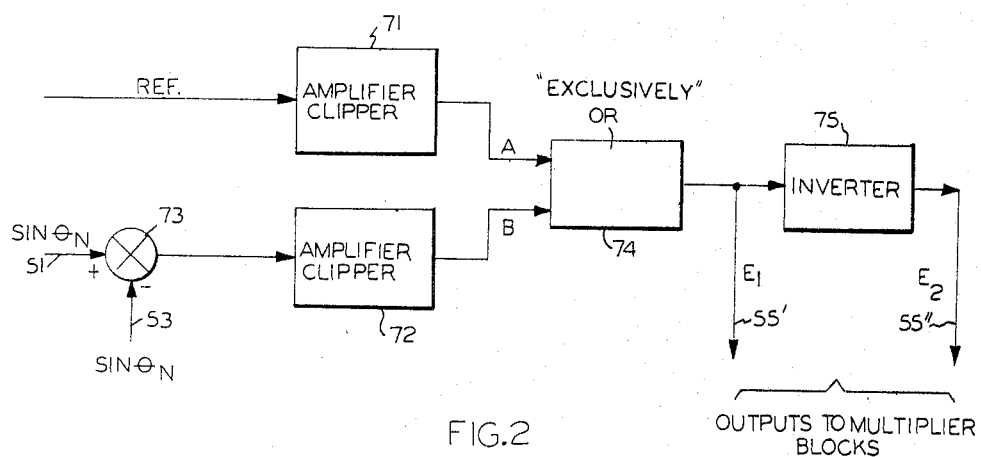
FIG. 2 depicts a block diagram of the comparator selector block of the embodiment of FIG. 1.

Turning now to FIG. 2, a block diagram of the comparator and selector stages 12, 22, etc., there is shown a pair of amplifier-clipper blocks 71 and 72, the input to amplifier 71 being a suitable reference voltage and the input to amplifier 72 being the output of a summer or adder circuit 73. The inputs to comparator 73 being $\sin \theta_N$ and $-\sin \Phi_N$ over leads 51 and 53 (FIG. 1), respectively. The output of amplifiers 71 and 72 designated A and B, are connected to an exclusive or circuit 74, the output of which is connected to the multipliers 13 to 15, etc. of FIG. 1 over lead 55' and the inverted output over load 55" via inverter 75. The leads 55' and 55" correspond to lead 55 shown in FIG. 1 as a single lead for the sake of simplicity.

In operation the signal $\sin \theta_N$ is compared to the signal representing $\sin \Phi_N$ in comparator or adder 73, the output of which is amplified and clipped in a conventional manner in block 72 and the reference voltage is similarly amplified and clipped in block 71. Both of these signals are applied to the "exclusive or" gate 74.

The logic for an "exclusive OR" is that an output signal is generated if either input is applied thereto but not if both are applied. Hence the truth able is:

| A | B | F |
|---|---|---|
| 1 | 1 | E₁ |
| 1 | 0 | E₂ |
| 0 | 1 | E₂ |
| 0 | 0 | E₁ |

Since the reference voltage is always at a level after amplification and clipping (A) to produce a voltage sufficient to qualify as an input signal to gate 74, we need only consider the first two possibilities in the truth table. First, if $\sin \theta_N \geq \sin \Phi_N$ then a B signal qualifying as an input to gate 74 is produced yielding an output from gate 74 of $E_1$, this signal is inverted in block 75 and produces a signal level $E_2$. However, if $\sin \theta_N < \sin \Phi_N$ a "negative" comparison results, the B signal is not qualifying and an $E_2$ output is generated by gate 74. The $E_2$ output is inverted and appears as $E_1$ on lead 55". Thus for the first condition voltages as shown are produced on leads 55' and 55", and for the second condition the voltages are interchanged.

Figure 3:
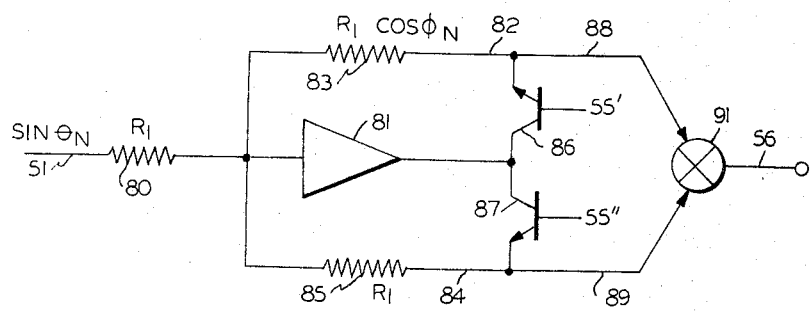
FIG. 3 is a partial block, partial schematic diagram of a typical multiplier block of the converter of FIG. 1.

A typical multiplier block, $\cos \psi_N$, is shown in FIG. 3, consisting of an input lead 51 via resistor 80 to an operational amplifier 81 having a first feedback loop 82 with a feedback resistor 83 in the loop and a second feedback loop 84 with a second feedback resistor 85 in the path. These loops are switched into feedback relationships in the circuit via suitable switches such as transistors 86 and 87 shown. The switches are controlled by connection to leads 55' and 55" from the comparator 12. The output leads 88 and 89 of the multiplier are summed in adder circuit 91.

In operation, with voltage $E_1$ on lead 55' and voltage $E_2$ on lead 55" transistor 86 is conductive and transistor 87 is nonconductive. Because of the high input impedance and low output impedance of the device virtually all the input current flows through to lead 88. The impedance of resistor 85 is of such magnitude that virtually no current flows therethrough. Hence, as in a single feedback amplifier the output is equal to the input times the ratio of the value of resistor 83 over the value of input resistor 80. Assigning a value of $R_1$ to resistor 80 and $R_1 \cos \Phi_N$ to resistor 83, knowing the input signal over lead 51 to be $\sin \theta_N$, the output signal is equal to:

$$\sin \theta_N \left( \frac{R_1 \cos \Phi_N}{R_1} \right) = \sin \theta_N \cos \Phi_N$$

If resistor 85 is in current, voltage $E_1$ appearing on lead 55" and $E_2$ on 55', rendering transistor switch 87 conductive and switch 86 nonconductive, the output appears as $$\sin \theta_N \left( \frac{R_1}{R_1} \right) = \sin \theta_N$$

Thus as was shown above, if $\sin \theta_N \geq \sin \Phi_N$, the output on lead 56 is $\sin \theta_N \cos \Phi_N$ and if $\sin \theta_N < \sin \Phi_N$, the output is $\sin \theta_N$.

A multiplier block for a $\sin \psi_N$ function may be fabricated by replacing resistor 83 with a resistor having a value of $R_1 \sin \theta_N$ and resistor 85 with a short circuit.

Therefore, the outputs of multiplier 14, for example would be $$\cos\theta_1 \frac{R_1 \sin \Phi_1}{R_1} = \cos\theta_1 \sin\Phi_1$$

and for the other selection $$\cos\theta_1 \frac{0}{R^1} = 0$$

Since the invention resides in the combination of circuit elements and not in any one particular element, all of which individually are well known in the prior art, recourse may be had to the literature for a description of such elements. No necessity was seen for overburdening the specification with a description of an embodiment employing specific circuitry. Suffice it to say that the general arrangement, since each of the stages is substantially identical, readily adapts to modular design utilizing state-of-the-art micrologic or integrated circuitry providing for a reliable, lightweight, shockproof, and low power device.

Obviously, many modifications and variations of the present invention are possible in light of that taught hereinbefore. It is therefore understood, that the invention may be practiced within the scope of the appended claims, otherwise, then as specifically described.

What is claimed is:

1. In a shaft angle to digital converter, a plurality of cascaded encoder stages, each having means for comparing analog signals representative of a trigonometric function of a first angle to a signal representative of a trigonometric function of a reference angle, means for providing a first digital output signal in response to said comparison, means operatively connected to said last mentioned means for generating a pair of simultaneous analog output signals representative of a pair of trigonometric identity functions of the difference between said first angle and said reference angle if said first angle is at least equal to said reference angle and for generating signals representative of said first angle if said angle is less than said reference angle, and means for applying said pair of analog output signals to the next encoder stage for obtaining the next digital output.

2. In the converter of claim 1, said generating means including a plurality of multipliers operatively connected to said comparison means and a plurality of adders operatively connected to said multipliers.

3. In the converter of claim 1, further means for providing input signals to the first of said stages indicative of trigonometric functions of an angular position to be converted and means for operatively coupling the signals from said generating means of a preceding stage to the comparison and generating means of a succeeding stage.

4. The device of claim 3 wherein said functions are sine and cosine functions.

5. The device of claim 3 wherein each of said generating means includes first and second multipliers to which are applied signals representative of the sine function and third and fourth multipliers to which are applied signals representative of the cosine function, and first and second adders operatively coupled to said first and third multipliers and said second and fourth multipliers, respectively.

6. The device of claim 3 wherein said further means is a resolver.

7. In the converter of claim 6, said comparison means further including means for generating the signal indicative of said reference angle where said angle in any one stage is equal to $45°/2^{N-1}$ where N is the order number of that particular stage.

8. A rotary angle to digital converter comprising:
a plurality of cascaded stages,
means producing a pair of analog signals representing different trigonometric functions of the rotary angle, and applying said pair of analog signals to one of said cascaded stages,
means in said stage for comparing one of said pair of analog signals with an analog reference signal corresponding to the same trigonometric function of a fixed reference angle to produce a digital signal corresponding to the greater of the analog and reference signal,
means responsive to the digital signal when the reference signal is greater than the analog signal to transmit the pair of analog signals to the next stage and responsive to the digital signal when the analog signal is greater than the reference signal to transmit a pair of second analog signals to the next stage that are proportional to different trigonometric functions of the difference in angle between the rotary angle and the reference angle,
said means for generating said pair of second analog signals comprising a plurality of multiplying circuits and adder circuits responsive to the pair of analog signals and to the reference signal to multiply the reference signal by each of the pair of analog signals and algebraically sum the products thereby to provide said pair of second analog signals corresponding to different trigonometric identity functions of the analog signals and reference signals.

9. In the converter of claim 8, said means for producing a pair of analog signals comprising means for producing signals constituting the sine and cosine functions of the rotary angle.

10. In the converter of claim 8, said means for generating the pair of second analog signals comprising means for applying one of said pair of analog signals and said reference signal to a first of said multiplying circuits to obtain a first product, means for applying the other of said analog signals and said reference signal to a second multiplying circuits to obtain a second product, and means for energizing said adder circuit by said pair of multiplying circuits to algebraically sum said first and second products.

References Cited

UNITED STATES PATENTS

| 3,071,324 | 1/1963 | Shroeder et al. | 340—347 |
| 3,100,298 | 8/1963 | Fluhr | 340—347 |
| 3,188,624 | 6/1965 | McMillian | 340—374 |
| 3,357,012 | 12/1967 | Brook | 340—347 |
| 3,376,570 | 4/1968 | Lawson | 340—347 |

MAYNARD R. WILBUR, Primary Examiner

MICHAEL K. WOLENSKY, Assistant Examiner